United States Patent [19]

Nakamura et al.

[11] Patent Number: 4,781,653

[45] Date of Patent: Nov. 1, 1988

[54] POWER TRANSMISSION DEVICE FOR MOTOR VEHICLE

[75] Inventors: Koyo Nakamura, Yokosuka; Yukihiro Etoh, Yokohama; Kenji Okamura, Yokosuka; Yoshiji Shimaoka, Yokosuka, all of Japan

[73] Assignee: Nissan Motor Co., Ltd., Yokohama, Japan

[21] Appl. No.: 812,405

[22] Filed: Dec. 23, 1985

[30] Foreign Application Priority Data

Dec. 27, 1984 [JP] Japan .................. 59-281342
May 10, 1985 [JP] Japan .................. 60-69230[U]
May 31, 1985 [JP] Japan .................. 60-118575

[51] Int. Cl.⁴ .................................. F16D 3/12
[52] U.S. Cl. .................. 464/58; 192/106.1
[58] Field of Search ............ 74/574; 192/106.1; 464/57, 58, 59, 81, 84, 100, 101

[56] References Cited

U.S. PATENT DOCUMENTS

| 1,975,772 | 10/1934 | Davis | 192/68 |
|---|---|---|---|
| 2,068,963 | 1/1937 | Spase | 192/106.1 |
| 4,181,208 | 1/1980 | Davis | 464/58 X |
| 4,210,234 | 7/1980 | Jones | 74/574 X |
| 4,220,233 | 9/1980 | Ban et al. | 192/106.2 |
| 4,223,776 | 9/1980 | Berlioux | 192/106.1 X |
| 4,274,524 | 6/1981 | Nakane | 74/574 X |
| 4,468,207 | 8/1984 | Yoshida | 464/81 X |
| 4,480,736 | 11/1984 | Loizeau | 192/106.1 |
| 4,583,959 | 4/1986 | Yoneda | 464/68 |
| 4,608,883 | 9/1986 | Bopp | 464/58 X |

FOREIGN PATENT DOCUMENTS

| 1953196 | 4/1970 | Fed. Rep. of Germany ........ 464/58 |
|---|---|---|
| 54-21 | 1/1979 | Japan . |
| 1199175 | 7/1970 | United Kingdom . |
| 1197404 | 7/1970 | United Kingdom . |
| 1230284 | 4/1971 | United Kingdom . |
| 1452956 | 10/1976 | United Kingdom . |
| 2056019 | 3/1981 | United Kingdom . |
| 2152187 | 7/1985 | United Kingdom . |
| 2153970 | 8/1985 | United Kingdom . |
| 2158189 | 11/1985 | United Kingdom . |
| 2160296 | 12/1985 | United Kingdom . |

Primary Examiner—Daniel P. Stodola
Attorney, Agent, or Firm—Foley & Lardner, Schwartz, Jeffery, Schwaab, Mack, Blumenthal & Evans

[57] ABSTRACT

A power transmission device for a motor vehicle having an engine with a crankshaft and a transmission with a transmission input shaft, comprises spiral spring assembly which provides a torque transmission connection between the crankshaft and the transmission input shaft. The assembly includes a plurality of spiral springs operative to be deformed responsive to torsional force applied thereto during the torque transmission. A vibration damper is mounted to damp vibration caused by the above mentioned torque transmission.

3 Claims, 11 Drawing Sheets

POWER TRANSMISSION DEVICE FOR MOTOR VEHICLE

BACKGROUND OF THE INVENTION

The present invention relates to a power transmission device for a motor vehicle which is designed to absorb shocks due to torque variation of the engine output.

Power transmission device for motor vehicles any be defined as a device that transmits torque produced by the engine to the driving wheels and it is composed generally of a clutch, a transmission, a differential, and drive axles.

Figure 2A:
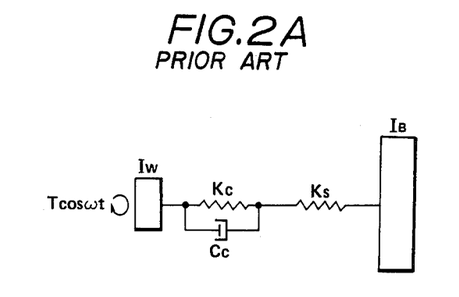
FIGS. 2A and 2B are simplified models of the conventional power transmission devices discussed in the foregoing description of the prior art.

A portion of the torque variation of the engine is absorbed by inertial moments and elastic deformation of constituents of the power transmission device. However, owing to their rigidity and little flexibility, they fail to absorb torque variation of the engine when the engine operates at low speeds, allowing longitudinal acceleration/deceleration to be imposed on the vehicle. At frequencies above 40 Hz where the drive axles have little vibration damping capability even though they work most effectively in absorbing torque variation, the overall system has insufficient vibration damping capability. Thus, the free vibration caused by an abrupt change in driving force, such as at acceleration, fails to be damped quickly, inducing vibration of the vehicle body. In order to examine the vibration characteristic of the power transmission device discussed above, reference is made to a simplified model shown in FIG. 2A. The reference characters used are as follows:

- $Iw$ = the inertia moment of rotary members of an engine;
- $Kc, Cc$ = the torsional spring constant and the damping coefficient of a mechanism, such as a clutch, between a flywheel and a transmission;
- $Ks$ = the torsonal ring constant of a mechanism between the transmission and driving wheels, $Ks$ = (the torional spring constant)/(the total reduction ratio, (i)$^2$. The damping coefficient provided here is substantially zero;
- $I_B$ = the vehicle's weight, $I_B = Mr^2/i$ (where, M: the vehicle's mass, r: the effective diameter of the tire i: the final reduction ratio).

The resonant frequency $f_0$ of this conventional system is expressed as:

$$f_0 = \frac{1}{2\pi}\sqrt{\frac{K}{I}}$$

where: $\frac{1}{K} = \frac{1}{Kc} + \frac{1}{Ks}$ and $\frac{1}{I} = \frac{1}{Iw} + \frac{1}{Is}$.

Figure 1:
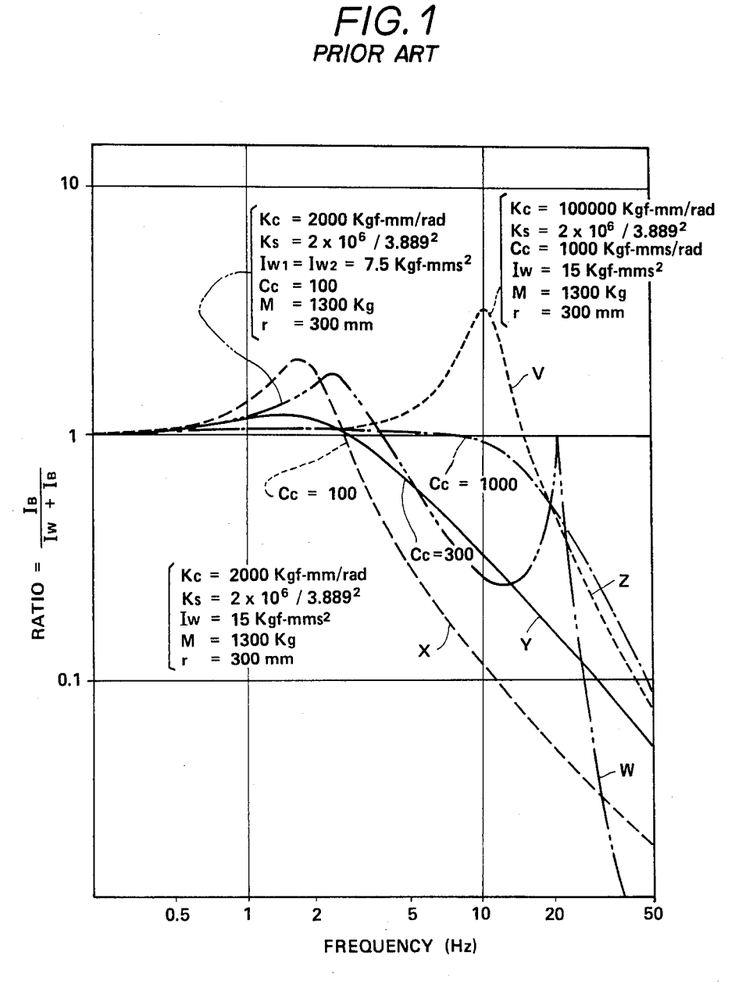
FIG. 1 is a graph showing various vibration characteristic curves including curves V and W discussed in the foregoing description of the prior art.

The dashed curve V shown in FIG. 1 shows the variation characteristics of the amplitude of torque imposed on $I_B$ when the external force (torque) $T \cos \omega t$ is applied to Iw. The vertical coordinate represents a ratio of the transmissibility of excitation force to the transmissibility thereof computed on the assumption that the spring constant is infinity ($=I_B/(I_w+I_B)$). The horizontal coordinate represents a frequency. As is readily understood from the dashed curve V shown in FIG. 1, the conventional power transmission device creates a great peak due to the resonance at around 10 Hz. Over a range of frequencies from 40 Hz to 50 Hz which corresponds to an operating condition where a 4-cycle internal combustion engine operates at speeds falling in a range from 1200 to 1500 rpm, the forced oscillation caused by torque variation produced by the engine cannot be damped to a satisfactorily low level.

Figure 2B:
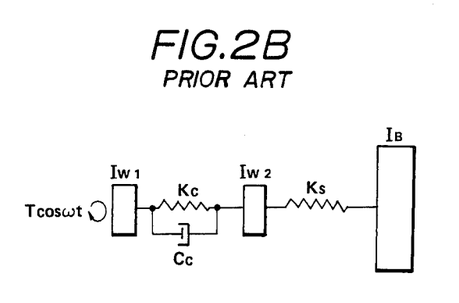

Published Japanese Patent Application No. (JP-A) 54-21 (not Japanese Pat. No. 968,953) discloses a clutch for a motor vehicle. In order to eliminate substantial shocks taking place upon abrupt engagement of the clutch, flywheel is divided into two parts and a helical spring is operatively disposed between them with its one end fastened to one part and the other end fastened to the other part. A power transmission device employing this known clutch may be expressed by a simplified model shown in FIG. 2B. The two dots chain line W shown in FIG. 1 shows the variation characteristic of the amplitude of torque imposed on $I_B$ when the external force (torque) $T \cos \omega t$ is applied to Iw. This curve W peaks at a resonant frequency falling in a range from 20 to 30 Hz, particularly at 21 Hz. Thus, the vibration of the system is brought into correspondance with the vibration of the second order when the engine operates at engine speeds falling in a range from 600 to 900 rpm, thus causing abrupt vibration to take place if the cluth is engaged upon starting the vehicle when the engine operates at low speeds. Thus, this characteristic is not satisfactory.

This known clutch tends to vibrate as a whole when a low torque is transmitted therethrough immediately after the maximum torque has been transmitted therethrough because the single spiral spring tends to have its center greatly deviated from the center of the clutch when it is unwound as a result of a rapid drop in torque after it has been tightly wound upon an application of the maximum torque. This eccentric state of the spiral spring creates a imbalance in centrifugal force and the deviation is further increased owing to the rotation of the clutch, thus causing vibration of the clutch as a whole.

SUMMARY OF THE INVENTION

An object of the present invention is to improve a power transmission device for a motor vehicle such that a jerk owing to longitudinal acceleration or deceleration that takes place when the vehicle is in motion with the engine operating at low speeds is eliminated and free vibration caused by an abrupt change in driving force such as at acceleration is effectively damped.

According to the present invention, there are provided means for providing a torque transmission connection between the crankshaft and the transmission input shaft, said torque transmission connection providing means including spring means operative to be deformed responsive to torsional force applied thereto during the torque transmission; and means for damping vibration caused by the torque transmission.

DESCRIPTION OF THE EMBODIMENTS

Referring to the accompanying drawings, embodiments according to the present invention are described. In the drawing, like reference numerals are used to denote like parts throughout all of the Figures to simplify the description.

Figure 3:
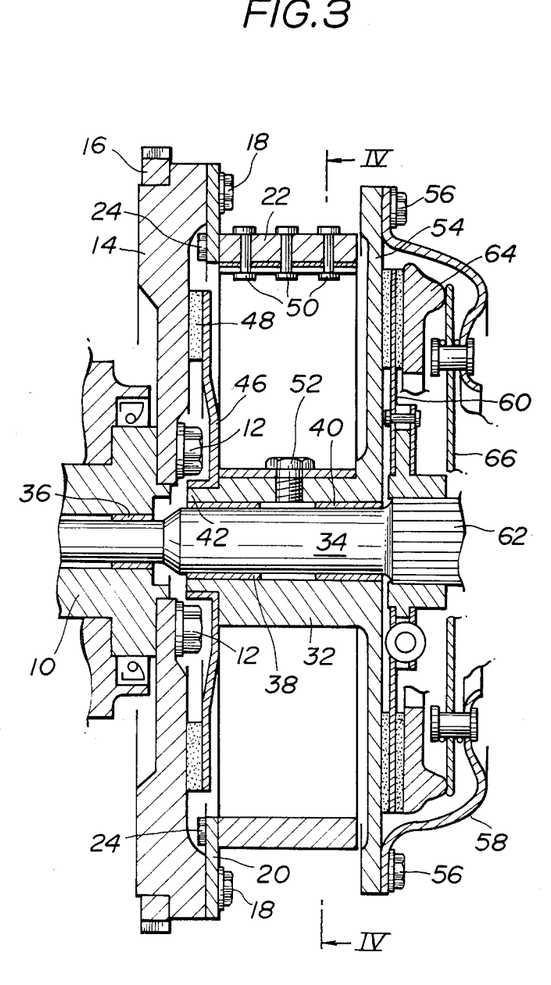
FIG. 3 is a fragmentary sectional view of a power transmission device for a motor vehicle according to the present invention and shows a manually operated clutch.
Figure 4:
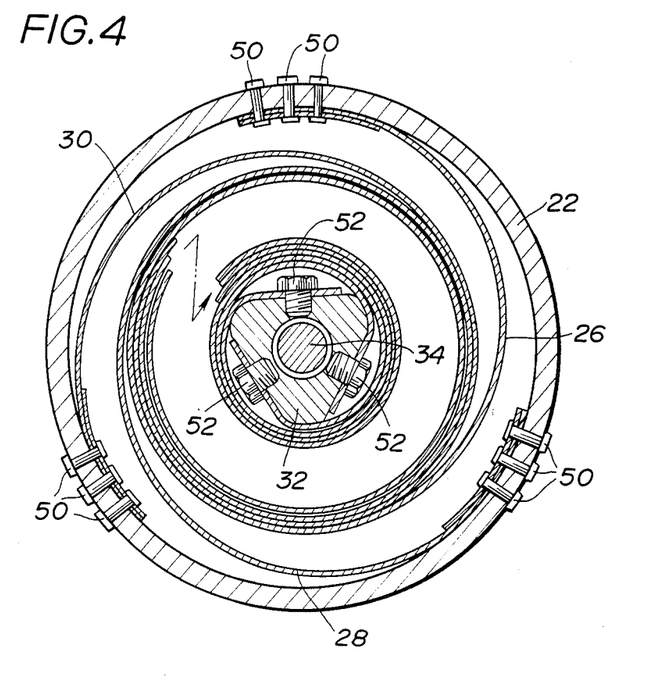
FIG. 4 is a cross section through the line IV—IV shown in FIG. 3 and shows the state of the clutch upon application of the maximum torque.

Referring to FIG. 3, there is shown an engine crankshaft 10. Secured by a plurality of bolts 12 to the crankshaft 10 is a flywheel 14 which has a ring gear 16 attached thereto. Secured to the flywheel 14 by a plurality of bolts 18 is an annular disk 20. An outer ring 22 is secured to the annular disk 20 by a plurality of bolts 24. A plurality, three in this embodiment, of spiral springs 26, 28, and 30 are operatively disposed between the outer ring 22 and an inner sleeve 32 as best seen in FIG. 4. A transmission input shaft 34 extends through the inner sleeve 32 into a bore formed in the crankshaft 10 and is rotatably held therein by means of bushing 36, 38, and 40. The sleeve 32 has a reduced diameter end portion 42 fixedly coupled to a center aperture 44 of a belleville spring 46 that has attached thereto a friction plate 48. The friction plate 48 is biased into frictional engagement with the adjacent wall of the flywheel 14 by the belleville spring 46.

As best seen in FIG. 4, the three spiral springs 26, 28, and 30 have their outer ends fastened to the outer ring 22 by means of rivets 50 at locations angularly displaced one after another through 120 degrees. Their inner ends are fastened to the inner sleeve 32 by means of bolts 52 at locations angularly displaced through 120 degrees. The setting is such that the spring constant and the length of each of the spiral springs 26, 28, 30 are so chosen that, in the illustrated state in FIG. 4 when the maximum torque is transmitted, the spiral springs 26, 28, and 30 wind one around another tightly at most portions thereof except their outer end portions where they are fastened to the outer ring 22.

Referring back to FIG. 3, the inner sleeve 32 has a radially extending wall portion 54 extending from the opposite end of the inner sleeve 32. Secured to the radially extending wall portion 54 by means of bolts 56 is a clutch housing 58. Within the clutch housing 58, there are mounted in the conventional manner a clutch disk assembly 60 splined to a spline portion 62 of the transmission input shaft 34, a pressure plate 64, a diaphragm clutch spring 66 biasing the pressure plate 64 and in turn the clutch disk 60 into frictional engagement with the radially extending wall portion 54. Although, not shown, a clutch release lever is provided which is manually operable to release the clutch in the known manner.

Assuming now that the clutch disk 60 is pressed into firm engagement with the radially extending wall portion 54 as illustrated in FIG. 3. i.e., the clutch is engaged, the engine torque is transmitted from the crankshaft 10 to the transmission input shaft 34 via the flywheel 14, annular disk 20, outer ring 22, spiral springs 26, 28, 30, inner sleeve 32, radially extending wall portion 54, and clutch disk assembly 60. During the transmission of torque, the outer ring 22 is twisted counterclockwise, as seen in FIG. 4, relative to the inner sleeve 32, keeping the spiral springs 26, 28, and 30 wound one around the other tightly to form an inner core. In this state, the centers of the spiral springs 26, 28, and 30 are not deviated from the center of the inner sleeve 32.

Figure 5:
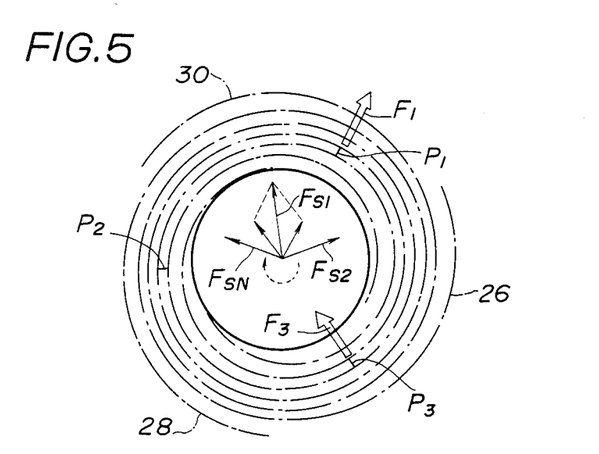
FIG. 5 is a diagram illustrating the operation.

If the accelerator pedal is released, the load having been imposed on the inner sleeve 32 is removed and thus the inner sleeve 32 begins to twist counterclockwise, as seen in FIG. 4, in a direction to unwind the spiral springs 26, 28, and 30, allowing the spiral springs 26, 28, and 30 to spread radially outwardly. In other words, the outer ring 22 rotates clockwise relative to the inner sleeve 32 as seen in FIG. 4. In this spreading process, each of the springs 26, 28, and 30 comes into contact with the adjacent one of the other two as shown in FIG. 5. Referring to FIG. 5, it is assumed that the spiral spring 28 contacts with the spiral spring 30 at a point $P_1$, the spiral spring 26 contacts with the spiral spring 28 at a point $P_2$, and the spiral spring 26 contacts with the spiral spring 30 at a point $P_3$. In the case of the spiral spring 26, it is subject to a radially outward force $F_1$ applied to the point $P_1$ by the spiral spring 28, and to a radially inward force at the point $P_3$ by the spring 26. The resultant force $F_{S1}$ of these two forces $F_1$ and $F_3$ originates at the rotation axis $P_4$ of the spiral springs 30, 26, and 28 and directed upward as viewed in FIG. 5, thus preventing the spiral spring 30 from tending to have its center deviated in the downward direction. The same mechanism is applied to the other two spiral springs 28 and 26, and thus these two springs 28 and 26 also spread outwardly with their centers kept at the rotation axis $P_4$. In the spreading process, after the inner end portions of the spiral springs 26, 28, and 30 which have been firmly wrapped around the triangular portion of the inner sleeve 32 became loose, the rotation of the inner sleeve 32 causes automatic centering of the inner end portions of the spiral springs 26, 28, and 30, thus allowing them to spread in good balance and equally. As a result, since the imbalance which might occur in the spreading process of the spiral spring 26, 28, and 30 is automatically balanced, the vibration of the device due to the imbalance of the spiral springs 26, 28, and 30 is prevented.

As mentioned in the foregoing, the spiral springs 26, 28, and 30 are tightly wound one around another at their radially inward portions upon application of torque, causing a decrease in the spring constant. Thus, the spring constant becomes small when the amplitude of excitation force is large during the operation with heavy load. This provides satisfactory damping effect.

Since the friction plate 48 is always held in frictional engagement with the flywheel 14 under the bias of the belleville spring 46, the frictional resistance created provides an appropriate vibration damping effect.

Although three spiral springs are used in the first embodiment described above, the number of the spiral springs is not limited to three, and two or four or more than four spiral springs may be used. If four spiral springs are used, it is not necessary to arrange them equidistant, and they may be allowed to angularly arrange with angular displacement 80°-100°-80°-100°.

Figure 6:
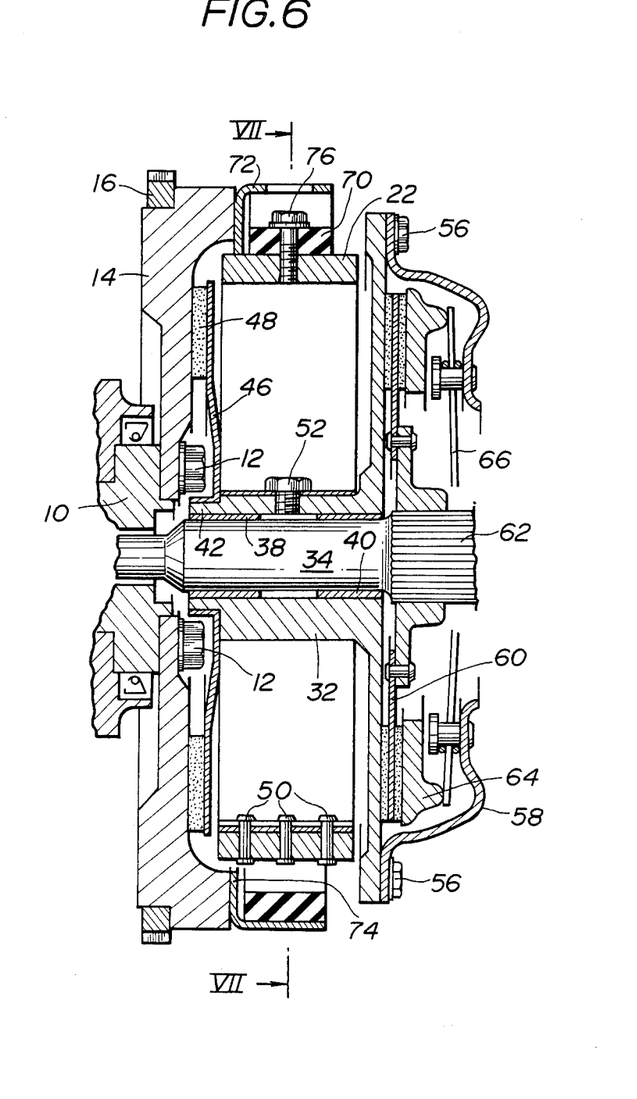
FIG. 6 shows a second embodiment.
Figure 7:
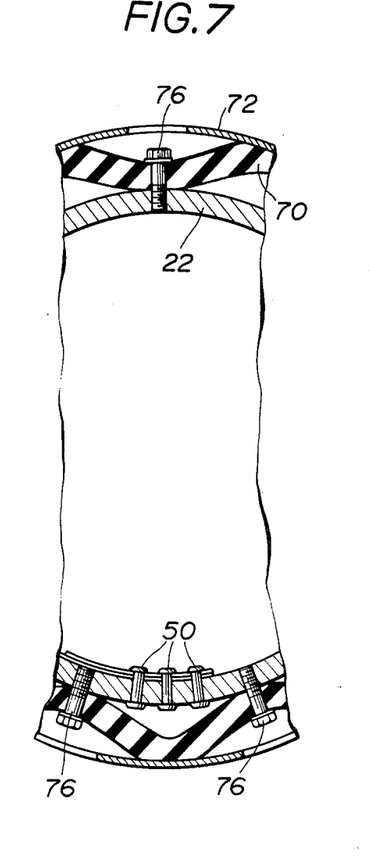
FIG. 7 is a cross section through the line VII—VII shown in FIG. 6.

Referring to FIGS. 6 and 7, a second embodiment is described hereinafter. This embodiment is substantially the same as the first embodiment except at the connection between the flywheel 14 and an outer ring 22. In the first embodiment shown in FIG. 3, the annular disk 20 provides a rigid connection between the flywheel 14 and the outer ring 22; in the embodiment of FIG. 6, having the outer ring 22 is connected to the flywheel 14 via an undulating ring 70 of an elastic material, such as a rubber, and a support ring 72 with a vertical annular wall 74.

Describing in detail, the vertical annular wall 74 is fixedly secured to the flywheel 14, and the elastic undulating ring 70 is fixedly secured to the inner wall of the support ring 72 at a plurality of portions angularly distant and it is secured to the outer ring 22 by means of bolts 76 as best seen in FIG. 7. Since, according to this second embodiment, the radial displacement of the outer ring 22 is allowed and absorbed by the elastic undulating ring 70, the transmission of a fluctuation in centrifugal force to the vehicle body is prevented.

Figure 8:
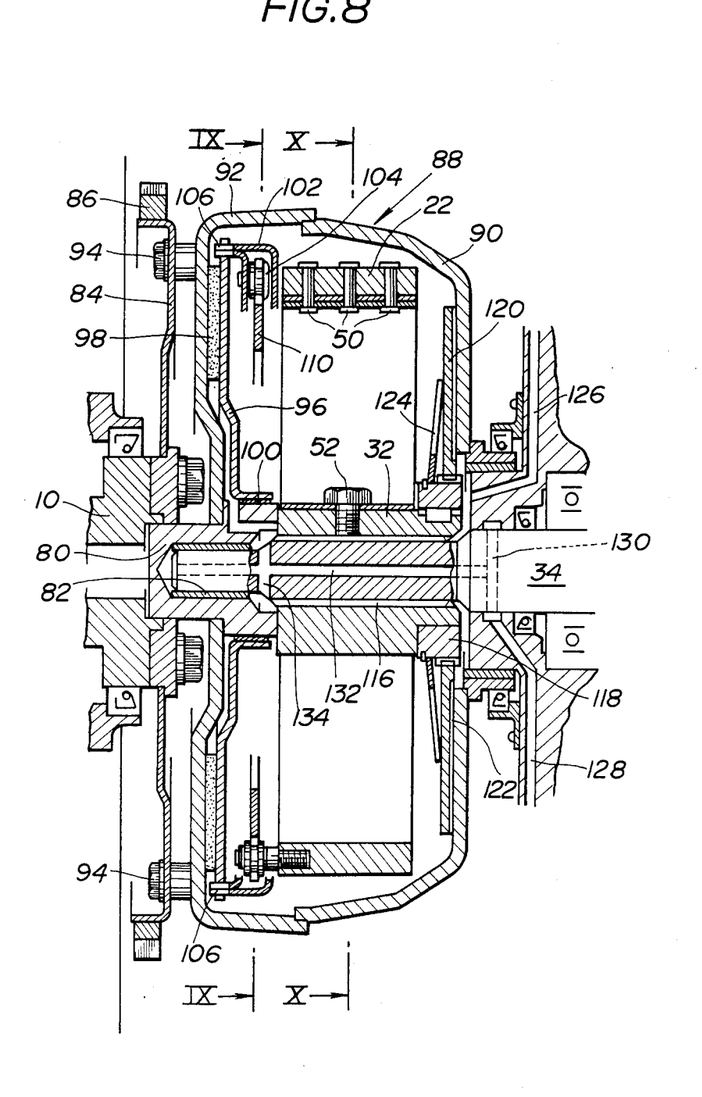
FIG. 8 is a fragmentary sectional view similar to FIG. 3 and shows a third embodiment wherein the invention is embodied in a hydraulic clutch.
Figure 9:
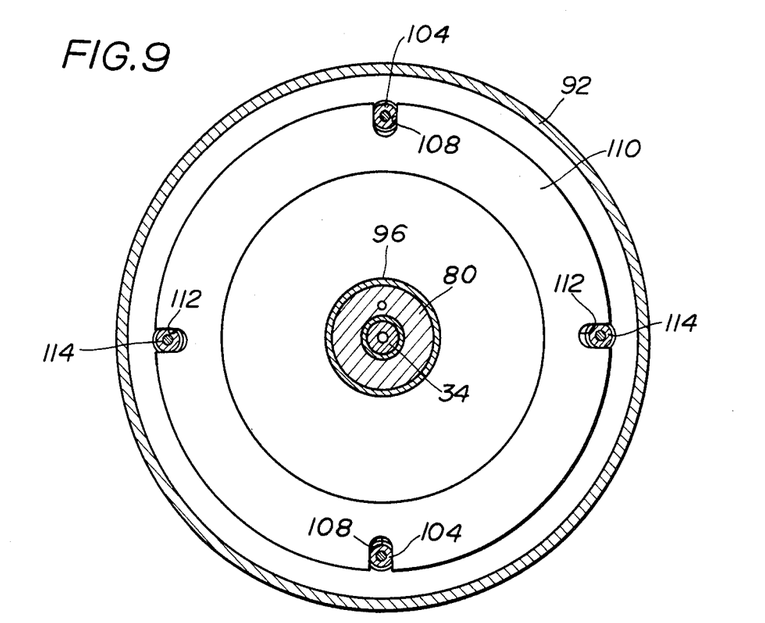
FIG. 9 is a cross section through the line IX—IX shown in FIG. 8.

Referring to FIG. 8, a third embodiment is described wherein the present invention is embodied in a hydraulically operatable clutch. There are shown an engine crankshaft 10 and a transmission input shaft 34. The transmission input shaft 34 has an end portion rotatably received in a blind bore formed in a centering block 80 that is centered with the crankshaft 10 by means of a bushing 82. Fixedly attached to the crankshaft 10 is a drive plate 84 having mounted thereon a ring gear 86. A clutch housing 88 includes a bell shaped housing section 90 and an end wall housing section 92. The end wall housing section 92 is secured to the drive plate 84 by means of bolts 94. Mounted within the clutch housing 88 are a clutch piston 96 with a friction plate 98 attached thereto. The clutch piston 96 is rotatably coupled with an enlarged diameter portion of the block 80 with a bushing 100 therebetween. Disposed within the clutch housing 88 are an outer ring 22, three spiral springs 26, 28, and 30, and an inner sleeve 32. The outer ring 22, three spiral springs 26, 28, and 30, and inner sleeve 32 are constructed and arranged in the same manner as described in connection with the first embodiment. An annular roller bearing 102 composed of two annular plates secured to each other at their outer peripheries and spaced apart to form two parallel guide plate portions within which a pair of rollers 104 are held at locations spaced angularly through 180 degrees. The roller bearing 102 is formed with a plurality of horizontal projections 106 received in the corresponding openings formed near the outer periphery of the clutch piston 96. As best seen in FIG. 9, the pair of rollers 104 are received in the corresponding cutouts 108 formed in a connection annular plate 110. The connection annular plate 110 is also formed with a pair of opposed cutouts 112 at portions angularly displaced through 90 degrees from the pair of cutouts 108 receiving the rollers 104.

Figure 10:
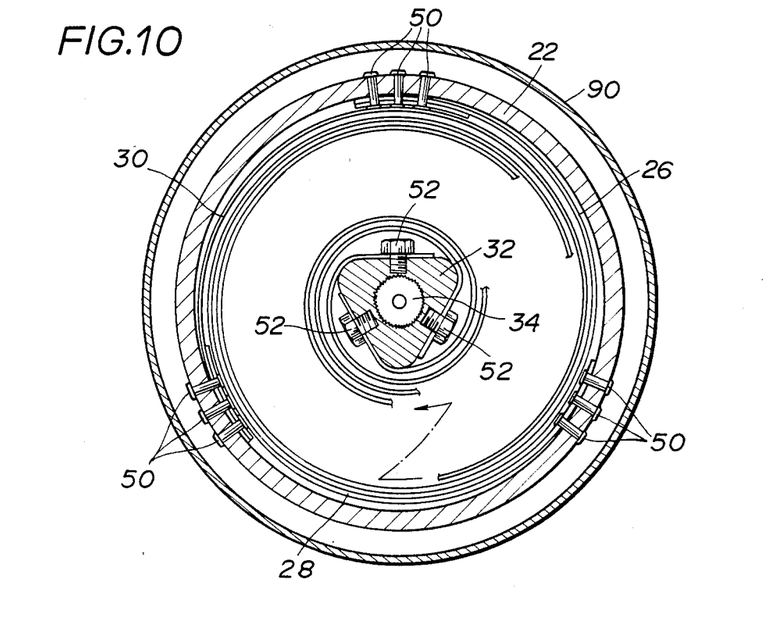
FIG. 10 is a cross section through the line X—X shown in FIG. 8 and shows the device when torque is transmitted therethrough.

The pair of cutouts 112 receive another rollers 114 which are rotatably mounted to an axial end of the outer ring 22. This connection between the clutch piston 96 and the outer ring 22 serves as a so-called Oldham coupling. The inner sleeve 32 is splined at 116 to the transmission input shaft 34. The spiral springs 26, 28, and 30 are connected between the outer ring 22 and the inner sleeve 32 as best seen in FIG. 10.

Fixedly coupled to an axial end of the inner sleeve 32 is a hub 118 splined to a splined opening of a friction disk 120 having a surface facing the vertical wall of the bell-shaped housing section 90. The facing surface is formed with a plurality of radially extending grooves 122 and is pressed into engagement with the vertical wall of the bell-shaped housing section 90 under the bias of a belleville damper spring 124.

Hydraulic fluid is always supplied to the inside of the clutch housing 88 via a fluid supply passage 126, the radical grooves 122. There is formed a fluid discharge passage 128 which communicates with a space defined between the clutch piston 96 and the end wall housing section 92 via a radial passage 130, an axial passage 132 and a radial passage 134.

The operation of this third embodiment is described hereinafter.

When the fluid discharge passage 128 is closed, since the hydraulic fluid is kept supplied to the inside of the clutch housing 88 and no pressure differential is created across the clutch piston 96, the friction plate 96 is disengaged from the end wall housing section 92 and thus the clutch is disengaged. In this state, the housing 88 and the hydraulic fluid contained therein rotate as a unitary body and thus serve as a flywheel.

When the discharge passage 128 is opened, the hydraulic fluid is discharged from the space defined between the clutch piston 96 and the end wall housing section 92, causing a drop in the pressure in the space and creating a pressure differential pressing the clutch piston 96 toward a position where the friction plate 98 is engaged with the end wall housing section 92. As a result, the clutch is engaged. In this state, the engine torque is transmitted to the transmission input shaft 34 via the clutch piston 96, outer ring 22, spiral springs 26, 28, 30, inner sleeve 32. The variation of torque during the torque transmission is absorbed by the spiral springs 26, 28, and 30. The shocks upon engagement of the clutch are also reduced by these spiral springs 26, 28, and 30

The deviation of the center of each of the spiral springs 26, 28, and 30 which might occur momentarily upon application of a low engine torque is suppressed in the manner described in connection with the first embodiment. The fluctuation in centrifugal force due to the deviation of the center of each of the spiral springs 26, 28, and 30 is prevented from being transmitted to the vehicle body by means of the Oldham coupling.

Figure 11:
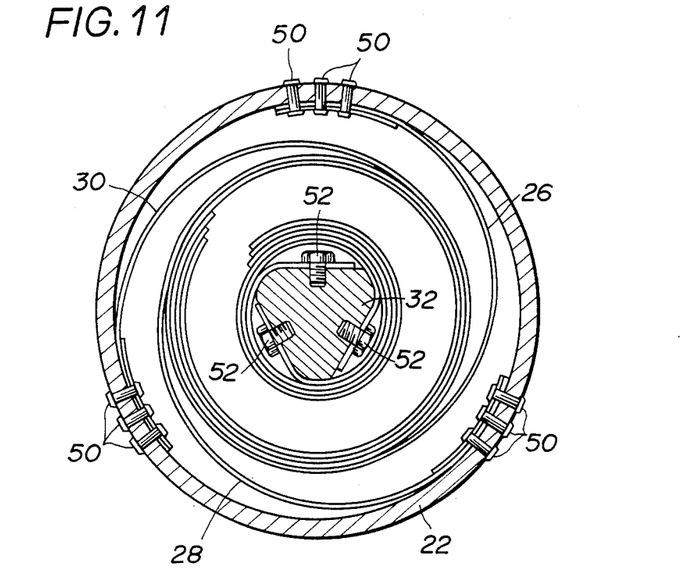
FIG. 11 is a similar view to FIG. 10 but simplified and shows the device subject to the maximum torque.
Figure 12:
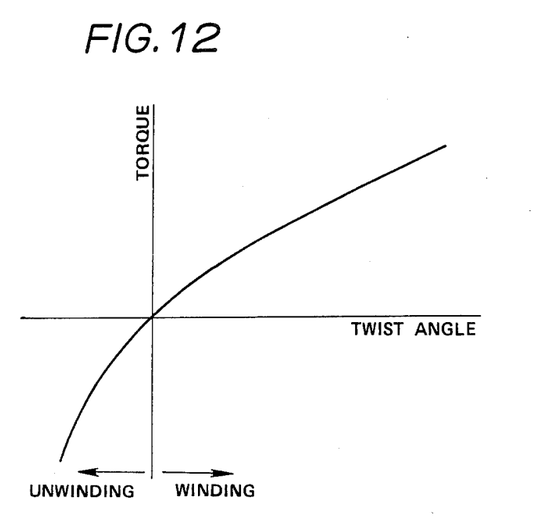
FIG. 12 is a graph showing a torque versus displacement characteristic curve.

The spiral springs 26, 28, and 30 are displaced in such a direction as to tighten their winding when the torque is increased in such a direction as to move the vehicle forward. Since, as shown in FIG. 11, the spiral springs 26, 28, and 30 are tightly engaged to form the inner core with the outer end portions of the spiral springs 26, 28, and 30 left disengaged from each other upon application of a torque greater than the maximum torque, the spring constant becomes small as the magnitude of the torque applied becomes large. As will be understood from the fully drawn curve shown in FIG. 12, the spring constant becomes small when the amplitude of the excitation force is large during the operation of the engine with heavy load.

The friction disk 120 is biased by the belleville spring 124 into engagement with the vertical wall of the bell-shaped housing section 90 and the hydraulic fluid flows through the radial grooves 122. This provides an appropriate viscous damping effect.

Figure 13:
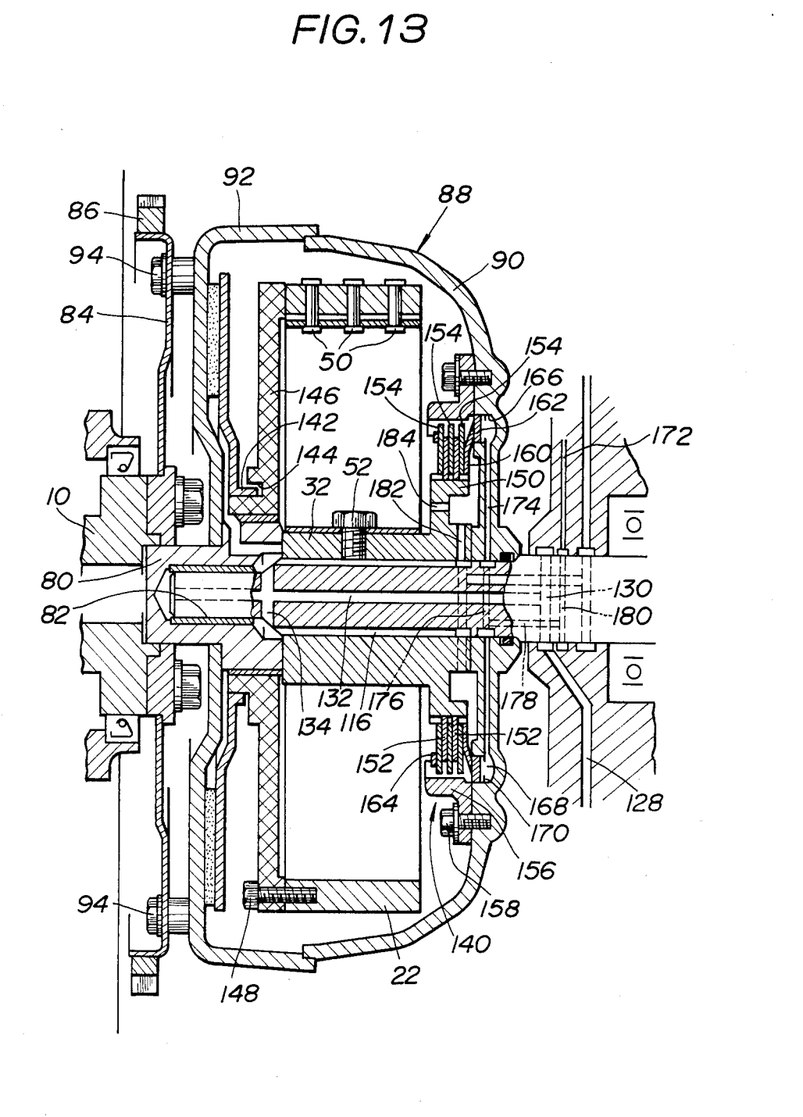
FIG. 13 is a similar view to FIG. 8 and shows a fourth embodiment.

Referring to FIG. 13, a fourth embodiment is now described. This embodiment is substantially similar to the third embodiment except the manner of connection between a clutch piston 96 and an outer ring 22, and the provision of a hydraulic damper generally denoted by the reference numeral 140.

As shown in FIG. 13, the clutch piston 96 has a plurality of horizontally projecting tabs 142 formed on the inner periphery thereof which are received by holes 144 formed in a connection disk 146 which is secured by bolts 148 to the outer ring 22.

An inner sleeve 32 splined to a transmission input shaft 34 is formed with a hub portion 150 which is splined to a plurality of clutch plates 152. The clutch plates 152 are interleaved with clutch plates 154 which are splined to a ring 156 secured by bolts 158 to the bell-shaped housing section 90. A belleville damper spring 160 is provided between the clutch plate assembly 152, 154 and a clutch piston 162 to bias the clutch plates 152 and 154 against a stop 164 to maintain frictional engagement between them. The clutch piston 162 is received in a cylinder 166, formed in the vertical wall of the bell-shaped housing section 90, to define therein a servo chamber 168. The excessive inward movement of the piston 162 is limited by a stop 170 formed in the cylinder 166. The servo chamber 168 communicates with a fluid passage 172 via a radial passage 174 formed through the vertical wall of the bell-shaped housing section 90.

As different from the third embodiment, the hydraulic fluid is supplied from a supply passage 126 to the inside of a clutch housing 88 via a radial passage 176, an axial passage 178 and a radial passage 180 which are formed through the transmission input shaft 34, a radial passage 182 and an axial passage 184 which are formed through the hub portion 150.

Figure 14:
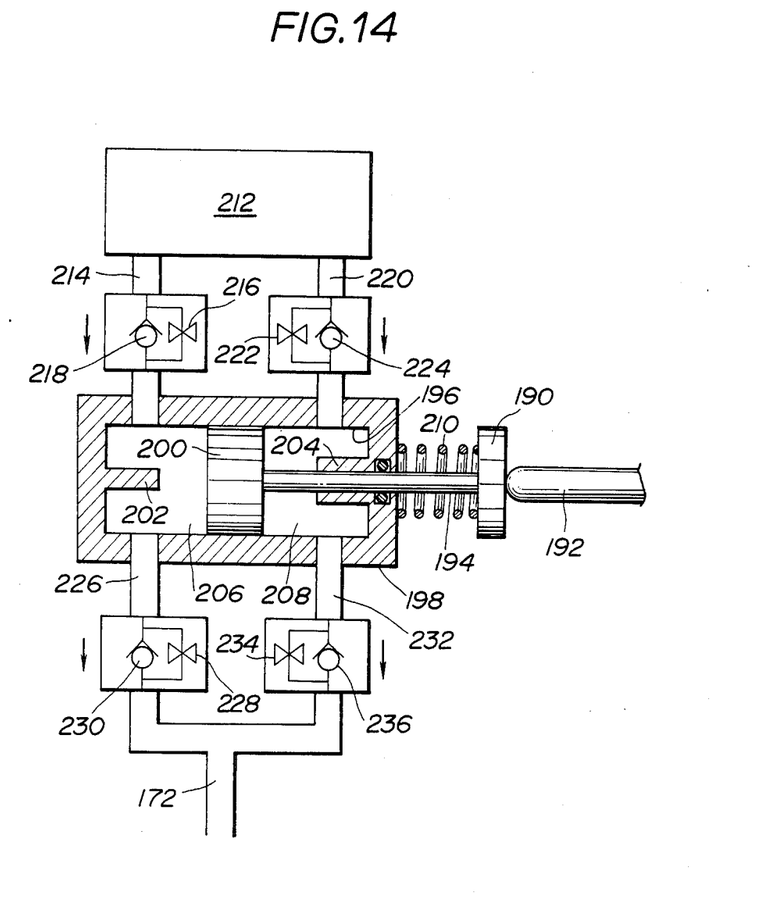
FIG. 14 is a diagram showing a control apparatus used in the fourth embodiment.

The fluid pressure within the servo chamber 168 is controlled by a control apparatus shown in FIG. 14. The fluid passage 172 shown in FIG. 13 is connected to the control apparatus shown in FIG. 14.

Referring to FIG. 14, the control apparatus comprises a plate 190 in abutting engagement with a link 192 of a throttle actuator which is movable in cooperation with an engine throttle valve, not shown. The plate 190 is fixed to an outward end of a piston rod 194 which extends into a cylindrical bore 196 formed in a valve housing 198. The piston rod 194 has an inward end fixedly connected to a piston 200 slidably received in the bore 196. The piston 200 is movable within the bore 196 between two limit positions defined by two inwardly projecting stops 202 and 204 and defines a first chamber 206 and a second chamber 208. A return spring 210 is provided to bias the plate 190 against the link 192. The control apparatus also comprises a hydraulic fluid tank 212 which communicates with the first chamber 206 via a fluid passage 214 having an orifice 216 that is bypassed by a one-way valve 218. The tank 212 communicates also with the second chamber 208 via a fluid passage 220 having an orifice 222 that is bypassed by a one-way valve 224. The first chamber 206 communicates with the fluid passage 172 (see FIG. 13 also) via a fluid passage 226 having an orifice 228 that is bypassed by a one-way valve 230. Similarly, the second chamber 208 communicates with the fluid passage 172 via a fluid passage 232 having an orifice 234 that is bypassed by a one-way valve 236. The one-way valves 218, 224, 230, and 236 permit direction of fluid flow only as indicated by the adjacent arrows.

The operation of this embodiment is described. Since the manner of engaging or disengaging the clutch is quite the same as the third embodiment shown in FIG. 8, the description of this portion of the operation is omitted.

During the transmission of torque with the clutch engaged, the helical springs 26, 28, and 30 work effectively to reduce the amplitude of vibration occurring around 10 Hz which is caused by torque variation of the second order during stable operation of the vehicle propelled by a 4-cycle 4-cylinder internal combustion engine. This results in providing a dashed curve as shown in FIG. 1. As will be understood from this curve X, although the amplitude of vibration at around 10 Hz has been reduced considerably, the amplitude of vibration having frequencies ranging from 1 Hz to several 10 Hz are relatively high. This high level of the amplitude of vibration of these frequencies causes the vehicle occupant to feel sick.

During the stable running of the vehicle, the damping coefficient Cc is kept small to provide the characteristic shown by the curve X in FIG. 1 by minimizing the effect provided by the hydraulic damper 140. This results in a reduction in the amplitude of the vibration of the second order which would be created by torque variation caused by combustion in the engine and imbalance due to motion of the reciprocally movable parts. During acceleration or deceleration after abrupt manipulation of the accelerator pedal, the damping coefficient Cc is increased until the characteristic curve Z shown in FIG. 1 is provided so as to reduce the amplitude of vibration within the low frequency range from 1 Hz to several Hz. Although, during the stable running when the position of the accelerator pedal is kept unchanged, the low frequency vibrations do not occur, an abrupt change in the position of the accelerator pedal causes a rapid change in engine torque, causing the free vibration to occur.

Describing in detail in connection with FIG. 14, when the accelerator pedal is depressed abruptly for rapid acceleration, the link 192 pushes the plate 190 to the left as viewed in FIG. 14 quickly against the bias of the return spring 210, causing the piston 200 to move to the left. This leftward movement of the piston 200 causes the hydraulic fluid to be displaced out of the first chamber 206. The hydraulic fluid displaced flows through the fluid passage 226, one-way valve 230, fluid passage 172 to the servo chamber 168 (see FIG. 13), causing the piston 162 to move to the left as viewed in FIG. 13, thus increasing the bias force. The increase in the bias force by the piston 162 results in reducing slip between the clutch plates 152 and 154. Thus, rapid depression of the accelerator pedal causes a rapid increase in force with which the belleville spring 160 biases the clutch plates 152 and 154 one after another. This causes a great increase in deamping force, thus causing a great increase in damping coefficient Cc. The variation in the damping coefficient Cc in the above manner provides a shift in characteristic from the curve X, to the curve y and then to the curve Z shown in FIG. 1.

The fluid within the servo chamber 168 is gradually discharged and returns to the tank 212 via orifices 216, 222, 228, and 234 allowing the piston 162 to move to the right as viewed in FIG. 13, causing a reduction in the damping coeficient Cc. Thus, there occurs a shift in the reverse direction from the curve Z, curve Y and then to curve X shown in FIG. 1 as time passes after the occurrence of the rapid depression of the accelerator for rapid acceleration.

During the above mentioned rapid leftward movement of the piston 200, the hydraulic fluid is supplied to the second chamber 208 from the tank 212 via the one-way valve 224 so as to facilitate this rapid movement of the piston 200.

When the accelerator pedal is abruptly released from the depressed position for rapid acceleration, the link 192 is pulled to move to the right as viewed in FIG. 14. Owing to the action of the return spring 210, the plate 190, and the piston 200 follow this rightward movement of the plate 190, causing the hydraulic fluid to be displaced out of the second chamber 208. The hydraulic fluid displaced out of the second chamber 208 is supplied to the servo chamber 168, causing the piston 162 to move to the left as viewed in FIG. 13, resulting in an increase in the damping coefficient Cc in the same manner as discussed above.

Similarly, the hydraulic fluid is gradually discharged from the servo chamber 168 via the orifices 216, 222, 228, and 234 as the time passes after the occurrence of the abrupt release of the accelerator pedal for rapid deceleration.

During the above mentioned rapid rightward movement, the hydraulic fluid is suppled to the first chamber 206 via the one-way valve 218 in order to facilitate this movement of the piston 200.

When the link 192 is disengaged from the plate 190, the return spring 210 biases the piston against the stop 204 to prevent the oversupply of hydraulic fluid to the servo chamber 168. The rightward movement of the piston 200 is limited by the stop 202 so as to prevent the oversupply of hydraulic fluid to the servo chamber 168 upon abrupt depression of the accelerator pedal for rapid acceleration.

Referring to FIG. 13, the damper piston 162 is biased against the stop 170 by the belleville spring 160 when there is no pressure within the servo chamber 168 so as to provide the characteristic curve X which corresponds to the minimum damping coefficient Cc=100 (see FIG. 1).

Although, in the fourth embodiment, the signal corresponding to the throttle opening degree is used as a parameter indicative of the engine operating condition, the engine intake manifold or engine speed or engine torque may be directly or indirectly detected in terms of an electric signal for use in a mincrocomputer based control apparatus for controlling the damping effect.

Since, according to this fourth embodiment, the damping effect is varied in accordance with a transient change in engine operating condition, the longitudinal acceleration or deceleration imposed on the vehicle body which would cause the vehicle occupant to feel uncomfortable is prevented.

As described in connection with the foregoing embodiments, the spiral spring 26, 28, and 30 work effectively to absorb the variation in engine torque with effectively suppressing the deviation of the center of each spiral spring from its axis of rotation.

What is claimed is:

1. A power transmission device for a motor vehicle having an engine with a crank shaft and flywheel and a transmission with a transmission input shaft, comprising:

means for providing a torque transmission connection between the crankshaft and the transmission input shaft, said torque transmission connection providing means including a spring spring assembly operably disposed between the crankshaft and the transmission input shaft to allow relative angular displacement between the crankshaft and the transmission input shaft;

vibration damping means separate from said spiral spring assembly for providing resistance to said relative angular displacement between the crankshaft and the transmission input shaft;

said spiral spring assembly including an outer ring and an inner sleeve, a plurality of spiral springs having inner ends thereof fastened to said inner sleeve and having outer ends thereof fastened to said outer ring at locations substantially equi-angularly distant from each other;

said outer ring being connected to a flywheel of said crankshaft; and said vibration damping means includes a friction plate and a belleville spring fastened to said inner sleeve and having a radially outward end portion fixed to said friction plate such that bias force of said belleville spring biases said friction plate into frictional engagement with the flywheel, said spiral springs being spirally wound about the longitudinal axis of said inner sleeve.

2. A power transmission device as claimed in claim 1, wherein said outer ring is connected to the flywheel via an annular disk.

3. A power transmission device as claimed in claim 1, wherein said outer ring is connected to the flywheel via an undulating ring of an elastic material.

* * * * *